US011065572B2

(12) United States Patent
Ahn et al.

(10) Patent No.: US 11,065,572 B2
(45) Date of Patent: Jul. 20, 2021

(54) INTEGRATED TREATMENT SYSTEM FOR COMPOSITE WASTE GAS INCLUDING NITROGEN OXIDES, CHLOROFLUOROCARBONS, HYDROCHLOROFLUOROCARBONS, HYDROFLUOROCARBONS, AND PERFLUORINATED COMPOUNDS

(71) Applicant: ECOPRO CO. LTD., Chungcheongbuk-do (KR)

(72) Inventors: Sang Jae Ahn, Seoul (KR); Jae Pil Mo, Suwon-si (KR); Jin Sang Kim, Hwaseong-si (KR); Sung Jong Cho, Cheongju-si (KR); Seong Jin Yoon, Seoul (KR); Dong Che Lee, Cheongju-si (KR)

(73) Assignee: ECOPRO CO. LTD.

( * ) Notice: Subject to any disclaimer, the term of this patent is extended or adjusted under 35 U.S.C. 154(b) by 481 days.

(21) Appl. No.: 16/300,536

(22) PCT Filed: Jul. 26, 2017

(86) PCT No.: PCT/KR2017/008041
§ 371 (c)(1),
(2) Date: Nov. 9, 2018

(87) PCT Pub. No.: WO2018/026134
PCT Pub. Date: Feb. 8, 2018

(65) Prior Publication Data
US 2020/0147541 A1 May 14, 2020

(30) Foreign Application Priority Data
Aug. 2, 2016 (KR) .......... 10-2016-0098375

(51) Int. Cl.
B01D 46/00 (2006.01)
B01D 47/06 (2006.01)
(Continued)

(52) U.S. Cl.
CPC ....... B01D 53/025 (2013.01); B01D 46/0035 (2013.01); B01D 47/06 (2013.01);
(Continued)

(58) Field of Classification Search
CPC ...... B01D 53/56; B01D 53/565; B01D 53/68; B01D 53/685; B01D 53/70;
(Continued)

(56) References Cited

U.S. PATENT DOCUMENTS 6,596,054 B2 * 7/2003 Flippo ............... B01D 53/0476
422/168
6,759,018 B1 * 7/2004 Arno ..................... B01D 19/04
261/21

FOREIGN PATENT DOCUMENTS

JP 2006312121 A 11/2006
JP 2007301467 A 11/2007
(Continued)

Primary Examiner — Timothy C Vanoy
(74) Attorney, Agent, or Firm — Renaissance IP Law Group LLP

(57) ABSTRACT

Disclosed is a system for integrally treating a composite waste gas including nitrogen oxides ($NO_x$ and $N_2O$), chlorofluorocarbons (CFCs), hydrochlorofluorocarbons (HCFCs), hydrofluorocarbons (HFCs), and perfluorinated compounds (PFCs). The system includes a first wet processor configured to wash and adsorb dust including gases, $SO_x$, and ash dissolved in water, a decomposing reactor configured to receive waste gas processed in the first wet processor and process nitrogen oxides ($NO_x$ and $N_2O$), fluorocarbons (CFCs), hydrochlorofluorocarbons (HCFCs), hydrofluorocarbons (HFCs), and perfluorinated compounds (PFCs) in the waste gas, and a second wet processor configured to
(Continued)

receive the waste gas processed in the decomposing reactor and wash and adsorb the received waste gas. The system can efficiently treat a large amount of composite waste gas.

9 Claims, 6 Drawing Sheets

(51) Int. Cl.
    *B01D 53/00* (2006.01)
    *B01D 53/02* (2006.01)
    *B01D 53/50* (2006.01)
    *B01D 53/56* (2006.01)
    *B01D 53/70* (2006.01)

(52) U.S. Cl.
    CPC ........... *B01D 53/005* (2013.01); *B01D 53/50* (2013.01); *B01D 53/56* (2013.01); *B01D 53/70* (2013.01)

(58) Field of Classification Search
    CPC ............ B01D 53/8625; B01D 53/8659; B01D 53/8662; B01D 53/14; B01D 51/00; B01D 47/06; B01D 2221/14; B01D 2257/206; B01D 2257/2066; B01D 2257/402; B01D 2257/404; B01D 2258/0216
    See application file for complete search history.

(56) References Cited

FOREIGN PATENT DOCUMENTS

| KR | 200204735 | 12/2000 | |
|---|---|---|---|
| KR | 100455009 B1 | 11/2004 | |
| KR | 20130119134 A | 10/2013 | |
| KR | 10 2 172 774 B1 * | 11/2020 | ............. B01D 53/68 |

* cited by examiner

INTEGRATED TREATMENT SYSTEM FOR COMPOSITE WASTE GAS INCLUDING NITROGEN OXIDES, CHLOROFLUOROCARBONS, HYDROCHLOROFLUOROCARBONS, HYDROFLUOROCARBONS, AND PERFLUORINATED COMPOUNDS

TECHNICAL FIELD

The present disclosure relates to a field of integrally treating a composite waste gas, and more particularly, to an integrated treatment system for a composite waste gas including nitrogen oxides, chlorofluorocarbons, hydrochlorofluorocarbons, hydrofluorocarbons, and perfluorinated compounds.

BACKGROUND ART

There are various nitrogen oxides depending on the bonding state of nitrogen and oxygen. Nitrogen oxides generated by the combustion of a fuel mostly consist of nitrogen monoxide (NO), nitrogen dioxide ($NO_2$), nitrogen trioxide ($N_2O_3$), and nitrogen pentoxide ($N_2O_5$). These compounds are generally called nitrogen oxides (hereinafter referred to as "$NO_x$").

A volume ratio of $NO/NO_R$ in combustion gases discharged from boiler combustion equipment is about 90 to 95%, and $NO_R$ in exhaust gases mostly consists of nitrogen monoxide (NO). Nitrogen monoxide (NO) is a colorless and odorless gas and is almost insoluble in water. $NO_2$ is produced by oxidation of NO in the atmosphere, and it is converted into nitric acid ($HNO_3$) through combination with moisture.

Nitrous oxide ($N_2O$) among greenhouse gases has been designated as one of target greenhouse gases to reduce, which include six substances such as $CO_2$, methane ($CH_4$), HFCs, PFCs, and $SF_6$. In addition, $NO_x$, $SO_2$, non-methane volatile organic compounds (NMVOCs), CO, and the like, as indirect greenhouse gases, have been designated to be reflected on in a greenhouse gas emission amount.

Further, The regulated greenhouse gases include chlorofluorocarbons (R11_CFCl3/R12_CF2Cl2) which are the first regulated substances of the Montreal Protocol and have been used as refrigerants or for foaming and cleaning in the automotive, LCD, and semiconductor industries, hydrochlorofluorocarbons (R22_CHClF2/R123_C2HCl2F3/R124_C2HClF4) which are the second regulated substances have been regulated since 2013 and are to be banned in 2030, and hydrofluorocarbons (HFCs, R134a_CH2FCF3/R32_CH2F2/R125_CHF2CF3/R152a_C2H4F2) which are substances developed as substitutes for hydrochlorofluorocarbons (HCFCs) and have been classified as greenhouse gases in the Kyoto Protocol due to high global warming potential although not depleting the ozone layer.

Recently, regulations on perfluorinated compounds (PFCs), wherein aliphatic hydrocarbons are substituted with a large amount of fluorine, have been strengthened. These perfluorinated compounds have been pointed out as the main cause of global warming due to a global warming potential thereof several thousand to tens of thousands of times higher than that of carbon dioxide. In addition, although some perfluorinated compounds are used as coatings for cooking vessels and paper cups or coolants, they are believed to cause brain, nerve, and liver toxicity and disturb hormone secretion.

A main generation source of perfluorinated compounds is a production process of semiconductor devices such as memories and LCDs. For example, perfluorinated compounds are widely used as an etchant in an etching process and a cleaning agent for a chamber in a chemical vapor deposition process and are discharged in a large amount in these processes. As representative examples of perfluorinated compounds, there are $CF_4$, $CHF_3$, $C_3F_6$, $CH_2F_2$, $C_3F_4$, $C_2F_6$, $C_3F_8$, $C_4F_{10}$, $C_5F_8$, $SF_6$, $NF_3$, and the like.

Since these composite gases, such as nitrogen oxides ($NO_x$ and $N_2O$), hydrochlorofluorocarbons (HCFCs), hydrofluorocarbons (HFCs), and perfluorinated compounds (PFCs including $CF_4$, $SF_6$, $NF_3$, and the like), are discharged from the industrial sites and the like, it is very important and necessary to integrally treat the same.

As conventional techniques for decomposing harmful gases, there are a selective non-catalytic reduction (SNCR) process, a selective catalytic reduction (SCR) process, a photocatalytic method, a cement kiln method, a liquid injection incineration method, a gaseous/fume oxidation method, a decomposing method using a reactor, an argon plasma arc application method, a microwave plasma application method, a gas phase catalytic dehalogenation method, a super-heated steam reactor application method, a catalytic destruction method, a chemical treatment method, a thermal oxidization method, and the like.

However, there have been difficulties in applying these technologies to integrated treatment of composite gases due to different characteristics of harmful gases to be treated. In addition, considering maintenance costs, treatment efficiency, and the like, it is difficult to secure a system having removal performance of 90% or more.

Until now, many methods and apparatuses for decomposing and removing specific gases, such as $NO_R$, $N_2O$, $SF_6$, $NF_3$, HCFCs, and HFCs, have been introduced. However, upon application of these existing methods, there have been problems such as high energy cost, generation of secondary $NO_x$ due to high-temperature combustion, and low treatment efficiency when the amount of harmful gases including nitrogen oxides, hydrochlorofluorocarbons, hydrocarbons, and perfluorinated compounds was large, i.e., when the amount is about 5 CMM (cubic meter per minute) or more.

DISCLOSURE

Technical Problem

Therefore, the present disclosure has been made in view of the above problems, and it is one object of the present disclosure to provide a system capable of integrally treating a composite waste gas including nitrogen oxides, chlorofluorocarbons, hydrochlorofluorocarbons, hydrofluorocarbons, and perfluorinated compounds.

Technical Solution

In accordance with an aspect of the present disclosure, the above and other objects can be accomplished by the provision of a system for integrally treating a composite waste gas including nitrogen oxides ($NO_x$ and $N_2O$), chlorofluorocarbons (CFCs), hydrochlorofluorocarbons (HCFCs), hydrofluorocarbons (HFCs), and perfluorinated compounds (PFCs), the system including a first wet processor configured to wash and adsorb dust including gases, $SO_N$, and ash dissolved in water; a decomposing reactor configured to receive waste gas processed in the first wet processor and process nitrogen oxides ($NO_x$ and $N_2O$), fluorocarbons (CFCs), hydrochlorofluorocarbons (HCFCs), hydrofluorocarbons (HFCs), and perfluorinated compounds (PFCs) in the waste gas; and a second wet processor configured to receive the waste gas processed in the decomposing reactor and wash and adsorb the received waste gas.

In an embodiment, one or more regenerator layers, one or more first catalytic layers for decomposing CFCs, HCFCs, HFCs, and PFCs, a combustion chamber, a reducing agent spraying part, a second catalytic layer for decomposing $N_2O$, and a third catalytic layer for decomposing $NO_x$ may be disposed in a processing chamber of the decomposing reactor. In this case, the decomposing reactor may be a horizontal type wherein a regenerator layer, a first catalytic layer, a combustion chamber, a first catalytic layer, a reducing agent spraying part, a second catalytic layer, a third catalytic layer, and a regenerator layer are sequentially disposed from a side in which waste gas is introduced.

In addition, the system may further include a heat exchanger configured to allow heat exchange between gas transferred to the decomposing reactor from the first wet processor and gas transferred to the second wet processor from the decomposing reactor.

The system may further include a preheater configured to pre-heat waste gas introduced to the decomposing reactor.

In another embodiment, the decomposing reactor may be a vertical type wherein two or more compartment spaces divided by partition walls with a predetermined height; and a combustion chamber provided in an integrated space over the compartment spaces are included in the processing chamber of the decomposing reactor.

In this case, a regenerator layer, a third catalytic layer, a second catalytic layer, a reducing agent spraying part, and a first catalytic layer may be sequentially stacked from bottom to top in each of the two or more compartment spaces, and gas inflow and discharge ports may be respectively provided at lower parts of the two or more compartment spaces. When any one of the gas inflow and discharge ports operates as a gas inlet port, any one of the remaining gas inflow and discharge ports may operate as a discharge port.

Two or more filter layers or packing layers, a cleaning water spraying part disposed so as to spray washing water to each of the two or more filter layers or packing layers, and two or more adsorption layers may be included in an interior of each of the first and second wet processors.

Advantageous Effects

As described above, the present disclosure provides a system for integrally treating a composite waste gas including nitrogen oxides ($NO_x$ and $N_2O$), fluorocarbons (CFCs), hydrochlorofluorocarbons (HCFCs), hydrofluorocarbons (HFCs), and perfluorinated compounds (PFCs). This system is very efficient because it integrally treats gases constituting the composite waste gas, instead of individually treating respective gases constituting the composite waste gas, by means of gas decomposer individually selected according to the characteristics of the respective gases. Such a configuration allows intensive design and placement in a facility and treatment of a large amount of harmful gases. For example, when an inflow amount of harmful gases is large, i.e., about 5 CMM (cubic meter per minute) or more, it is possible to integrally treat the same, and such large amounts of harmful gases can be treated at low energy costs. Therefore, the system exhibits a removal performance of about 90% without generation of secondary $NO_R$.

DETAILED DESCRIPTION

Figure 1:
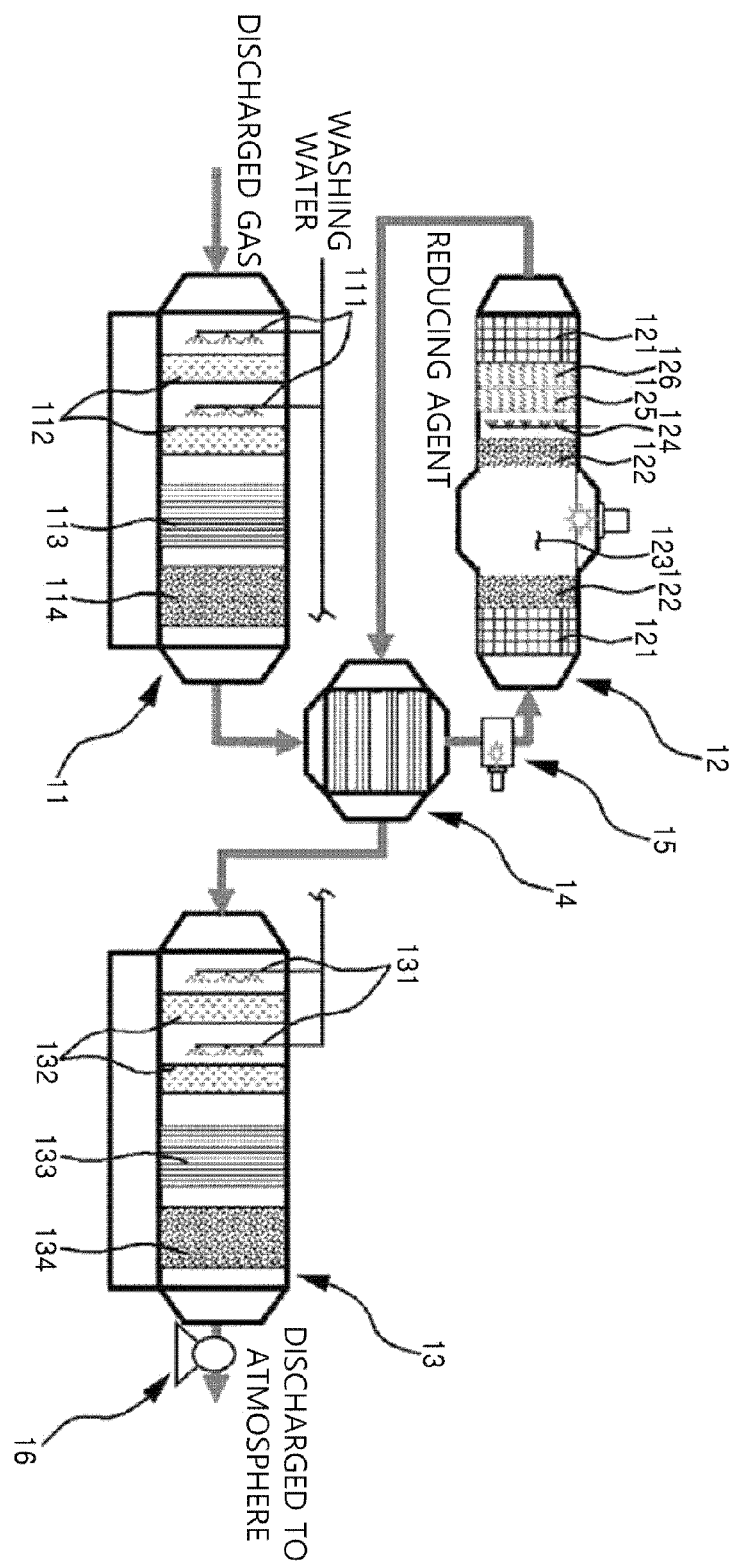
FIG. 1 is a drawing schematically illustrating a system for integrally treating a composite waste gas according to a first example of the present disclosure.

A system for integrally treating a composite waste gas of the present inventive concept includes a first wet processor 11, 21, or 31, a decomposing reactor 12, 22, or 32, and a second wet processor 13, 23, or 33. The system for integrally treating a composite waste gas of the present inventive concept may be used to integrally treat the aforementioned composite waste gas and implemented as first to third examples as described in detail below.

The first wet processor 11, 21, or 31 washes and adsorbs dust including gases, $SO_N$, and ash, which can be dissolved in water.

The decomposing reactor 12, 22, or 32 receives waste gas from the first wet processor 11, 21, or 31 and decomposes nitrogen oxides ($NO_x$ and $N_2O$), CFCs, HCFCs, HFCs, and PFCs.

The second wet processor 13, 23, or 33 receives the waste gas decomposed in the decomposing reactor 12, 22, or 32 and performs washing and adsorbing process on the same.

Each of the first wet processor 11, 21, or 31, the decomposing reactor 12, 22, or 32, and the second wet processor 13, 23, or 33, which are included in the system for integrally treating a composite waste gas of the present disclosure, may take the form of a device or equipment having a processing space or chamber, and these components may be connected to each other by a gas transfer or delivery means such as a pipe. Accordingly, the first wet processor 11, 21, or 31, the decomposing reactor 12, 22, or 32, and the second wet processor 13, 23, or 33 are sequentially arranged in a flow direction of waste gas and perform predetermined processing operations.

The decomposing reactor 12, 22, or 32 included in the system for integrally treating a composite waste gas of the present disclosure includes a configuration capable of treating nitrogen oxides ($NO_x$ and $N_2O$), CFCs, HCFCs, HFCs, and PFCs. For example, one or more regenerator layers 121, 221, or 321, one or more first catalytic layers 122, 222, or 322 for decomposing CFCs, HCFCs, HFCs, and PFCs, a combustion chamber 123, 223, or 323, a reducing agent spraying part 124, 224, or 324, a second catalytic layer 125, 225, or 325 for decomposing $N_2O$, and a third catalytic layer 126, 226, or 326 for decomposing $NO_x$ are included in a processing space or chamber of the decomposing reactor 12, 22, or 32, whereby a composite waste gas including nitrogen oxides (NO$_x$ and N$_2$O), CFCs, HCFCs, HFCs, and PFCs may be integrally, efficiently processed.

Such a decomposing reactor 12, 22, or 32 may be implemented as various embodiments, and detailed description thereof is provided below.

First Example

FIG. 1 is a drawing schematically illustrating a first example of the system for integrally treating a composite waste gas of the present inventive concept.

As shown in FIG. 1, the first example of the system for integrally treating a composite waste gas of the present inventive concept includes a first wet processor 11, a decomposing reactor 12, and a second wet processor 13. In addition, the system for integrally treating a composite waste gas of the first example may further include a heat exchanger 14 and a preheater 15.

First Wet Processor 11

The first wet processor 11 is a pretreatment apparatus for washing and adsorbing a composite waste gas. The first wet processor 11 includes two or more filter or packing layers 112 configured to be capable of being cleaned with water; and the cleaning water spraying parts 111 configured to be capable of respectively spraying water to the filter or packing layers 112. In addition, the first wet processor 11 includes first and second adsorption layers 113 and 114. The first wet processor 11 may be a horizontal wet processor wherein an introduced composite waste gas flows in a horizontal direction.

The two or more filter or packing layers 112 are used to wash dust, which includes SO$_x$ and ash generated in a combustion process of fossil fuel including water-dissolved gas and sulfur (S) in a composite waste gas, with water. The two or more filter or packing layers 112 have a filter shape or packing layers capable of increasing contact between an introduced gas and washing water, and the cleaning water spraying parts 111 include spraying nozzles that are arranged to allow washing water to flow upward to downward so as to cross-wash an introduced horizontally-flowing composite waste gas. The filter and packing layers 112 and the spraying nozzles may be made of a material, such as a salt containing a silica component, ammonium bisulfate, ammonium sulfate, or a silane that does not easily stick to a cohesion-inducing substance, etc. after contact with water (e.g., PE, PP, PTFE, PFA, ETFE, etc.).

The first and second adsorption layers 113 and 114 are used to remove halogen compounds (HF, HCl, BCl$_3$, CCl$_4$, etc.), which might reduce the performance of decomposing catalysts, in an introduced composite waste gas, salts generated in a neutralization processing process of acidic gas, and byproducts generated in a combustion process of fossil fuel including sulfur (S) and subsequent processes. SO$_x$ is generated in the combustion process of fossil fuel including sulfur (S). More particularly, SO$_x$ is gaseous sulfur dioxide (SO$_2$) in an initial stage, and then is converted into extremely fine aerosol-type sulfur trioxide (SO$_3$). When the SO$_3$ contains a larger amount of water, byproducts, such as sulfuric acid (H$_2$SO$_4$), floating in a particulate or mist state are generated.

Examples of an adsorbent material applicable to the first and second adsorption layers 113 and 114 may include bauxite, activated magnesium oxide, zeolite, activated alumina, activated carbon, silica gel, bone black, molecular sieve carbon, ion exchangeable carbon, MR-type ion-exchange resin, activated clay, and the like. These adsorbent materials may be mixed with one or more substances, such as an inorganic compound, depending upon the structural characteristics thereof to satisfy the characteristics of an adsorbed material.

Decomposing Reactor 12

The decomposing reactor 12 used in the first example is a horizontal reactor. While flowing a composite waste gas, which has been introduced into the decomposing reactor 12, in a horizontal direction, nitrogen oxides (NO$_x$ and N$_2$O), CFCs, HCFCs, HFCs, and PFCs are decomposed in a processing space or chamber thereof.

In the processing chamber of the decomposing reactor 12 of the first example, regenerator layers 121 disposed at front and rear ends thereof, first catalytic layers 122 for decomposing CFCs, HCFCs, HFCs and PFCs, a combustion chamber 123, a reducing agent spraying part 124, a second catalytic layer 125 for decomposing N$_2$O, and a third catalytic layer 126 for decomposing NO$_x$ are arranged.

The regenerator layers 121 are respectively disposed, as ceramic regenerators, at front and rear ends of the processing chamber so as to prevent heat loss.

After the regenerator layer 121 at the front end, the first catalytic layer 122 for decomposing CFCs, HCFCs, HFCs, and PFCs is disposed. As illustrated in the drawing of the first example, the first catalytic layers 122 may be disposed before and after the combustion chamber 123.

The combustion chamber 123 is provided with a heat source that is capable of maintaining an operation temperature (350 to 800° C.) of the catalytic reactor. As a means of the heat source, a burner capable of combustion with LPG or LNG and combustion air, an argon plasma arc, inductively-coupled radio-frequency plasma, a nitrogen plasma arc, microwave plasma, or the like may be used, but the present invention is not limited thereto.

The reducing agent spraying part 124 is disposed to spray ammonia, urea, a hydrocarbon, etc. into gas after a catalytic reaction.

After the reducing agent spraying part 124, the second catalytic layer 125 for decomposing N$_2$O and the third catalytic layer 126 for decomposing a catalyst and NO$_x$ are sequentially disposed.

These components are horizontally arranged, thereby lowering the pressure of the integrated treatment system including the decomposing reactor in a process of decomposing harmful gases.

Preferably, components, such as the catalytic layers, the regenerator layer, and the combustion chamber, may be constituted as separate modules to allow partial or individual replacement, or the entire reactor may be replaced. In addition, catalysts included in the aforementioned catalytic layers may have a spherical shape, a pellet shape, a hollow cylinder shape, a honeycomb shape, or the like, and may be constituted so as to be integrally or bulkily replaced depending upon the shape thereof.

Examples of decomposing reaction formulas for respective ingredients in the decomposing reactor 12 are as follows:

Decomposing reaction formula for NO$_x$ and N$_2$O $$2N_2O \rightarrow 2N_2 + O_2$$

$$4NO + 4NH_3 + O_2 \rightarrow 4N_2 + 6H_2O$$

$$2NO_2 + 4NH_3 + O_2 \rightarrow 3N_2 + 6H_2O$$

Decomposing reaction formula for CFCs $$CFCl_3 + 2H_2O \rightarrow CO_2 + 3HCl + HF$$

Decomposing reaction formula for HCFCs $$CHClF_2 + H_2O + \tfrac{1}{2}O_2 \rightarrow 2HF + HCl + CO_2$$

Decomposing reaction formula for HFCs $$CHF_3 + H_2O \rightarrow CO + 3HF$$

Decomposing reaction formula for PFCs $$CF_4 + 2H_2O \rightarrow CO_2 + 4HF$$

$$SF_6 + 3H_2O \rightarrow SO_x + 6HF$$

$$2NF_3 + 3H_2O \rightarrow NO + NO_2 + 6HF$$

$$2NF_3 + 3H_2O \rightarrow N_2O + O_2 + 6HF$$

Second Wet Processor 13

The second wet processor 13 used in the system for integrally treating a composite waste gas according to the first example is used to remove gases, such as HF, HCl, and unreacted ammonia, partially-unreacted gases containing non-processed fluorine (F), ammonium sulfate, and salts generated in a neutralization process, after the processing using the decomposing reactor 12.

The second wet processor 13 includes two or more filter or packing layers 132 configured to be capable of being cleaned with water; and the cleaning water spraying parts 131 configured to be capable of respectively spray water to the filter or packing layers 132. In addition, the second wet processor 13 includes the first and second adsorption layers 133 and 134. The second wet processor 13 may be a horizontal type wherein an introduced composite waste gas flows in a horizontal direction.

The two or more filter or packing layers 132 are used to wash dust, which includes $SO_x$ and ash generated in a combustion process of fossil fuel including water-dissolved gas, ammonia, ammonium salts, and ash in a composite waste gas, with water. The two or more filter or packing layers 132 have a filter shape or packing layers capable of increasing contact between an introduced gas and washing water, and the cleaning water spraying parts 131 include spraying nozzles that are arranged to allow washing water to flow upward to downward to alternately wash an introduced composite waste gas horizontally flowing. The filter and packing layers 132 and the spraying nozzles may be made of a material, such as a salt containing a silica component, ammonium bisulfate, ammonium sulfate, or a silane that does not easily stick to a cohesion-inducing substance, etc. after contact with water (e.g., PE, PP, PTFE, PFA, ETFE, etc.).

The first and second adsorption layers 133 and 134 include an adsorbent capable of additionally adsorbing one or more partially untreated gases ($CF_4$, $CHF_3$, $C_3F_6$, $CH_2F_2$, $C_3F_4$, $C_2F_6$, $C_3F_8$, $C_4F_{10}$, $C_5F_8$, $SF_6$, $NF_3$, $CHClF_2$, etc.).

Examples of an adsorbent material applicable to the first and second adsorption layers 133 and 134 may include bauxite, activated magnesium oxide, zeolite, activated alumina, activated carbon, silica gel, bone black, molecular sieve carbon, ion exchangeable carbon, MR-type ion-exchange resin, activated clay, and the like. These adsorbent materials may be mixed with one or more substances, such as an inorganic compound, depending upon the structural characteristics thereof to satisfy the characteristics of an adsorbed material.

Heat Exchanger 14

The heat exchanger 14 used in the first example allows heat exchange between gas from the first wet processor 11 and gas from the decomposing reactor 12. In an embodiment, the heat exchanger 14 may be disposed at an intersection where a pipe connected between a discharge side of the first wet processor 11 and an inlet side of the decomposing reactor 12 intersects a pipe connected between a discharge side of the decomposing reactor 12 and an inlet side of the second wet processor 13.

Preferably, the heat exchanger 14 may be applied to the horizontal decomposing reactor according to the first example. The heat exchanger 14 cools gas discharged from the decomposing reactor 12 and introduced to the second wet processor 13 while pre-heating gas introduced to the decomposing reactor 12 from the first wet processor 11, for a decomposing reaction, using the heat of gas discharged after the decomposing reaction.

Figure 2:
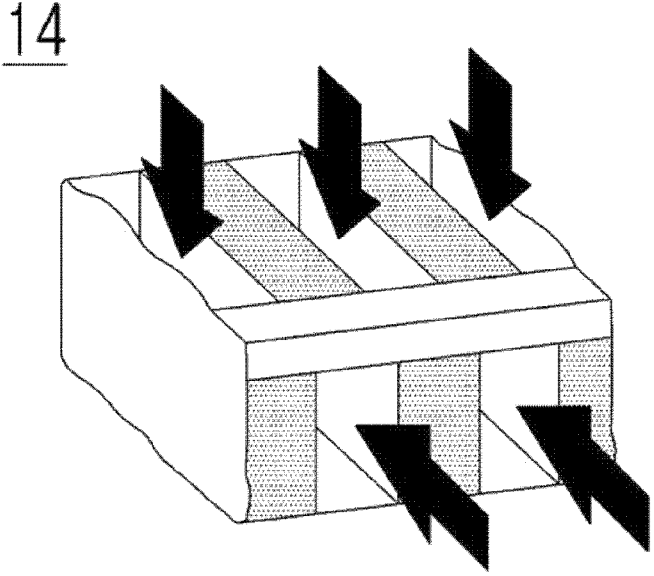
FIG. 2 is a drawing schematically illustrating a heat exchanger included in the system according to the first example of FIG. 1.

Another embodiment of the heat exchanger 14 is illustrated in FIG. 2. As shown in the drawing, in the heat exchanger 14, a method may be adopted wherein gas from the decomposing reactor 12 flows in a horizontal direction and gas from the first wet processor 11 flows in a longitudinal direction to cross each other. This may be realized by forming a slot passage where the horizontal gas flow intersects with the longitudinal gas flow, but the present invention is not limited thereto.

Preheater 15

The horizontal decomposing reactor 12 included in the system for integrally treating a composite waste gas according to the first example may further include a preheater for pre-heating waste gas fed to the decomposing reactor, considering that the decomposing reactor 12 is at room temperature during initial operation. The preheater 15 may shorten a time required to reach an operation temperature of the decomposing reactor 12. After the initial operation, the preheater 15 does not operate, and an operation temperature may be maintained at the temperature of the heat exchanger 14 and the regenerator layers 121 in the decomposing reactor 12.

As a heat source of the preheater 15, a burner capable of combustion with LPG or LNG and combustion air, an argon plasma arc, inductively-coupled radio-frequency plasma, a nitrogen plasma arc, microwave plasma, or the like may be used, but the present invention is not limited thereto.

Fan 16

To discharge waste gas processed in the second wet processor 13 to the atmosphere, the fan 16 may be further included. To control an air volume depending upon a pressure difference between the first and rear ends of the integrated treatment system, a fan provided with control logic is provided.

Second Example

Figure 3:
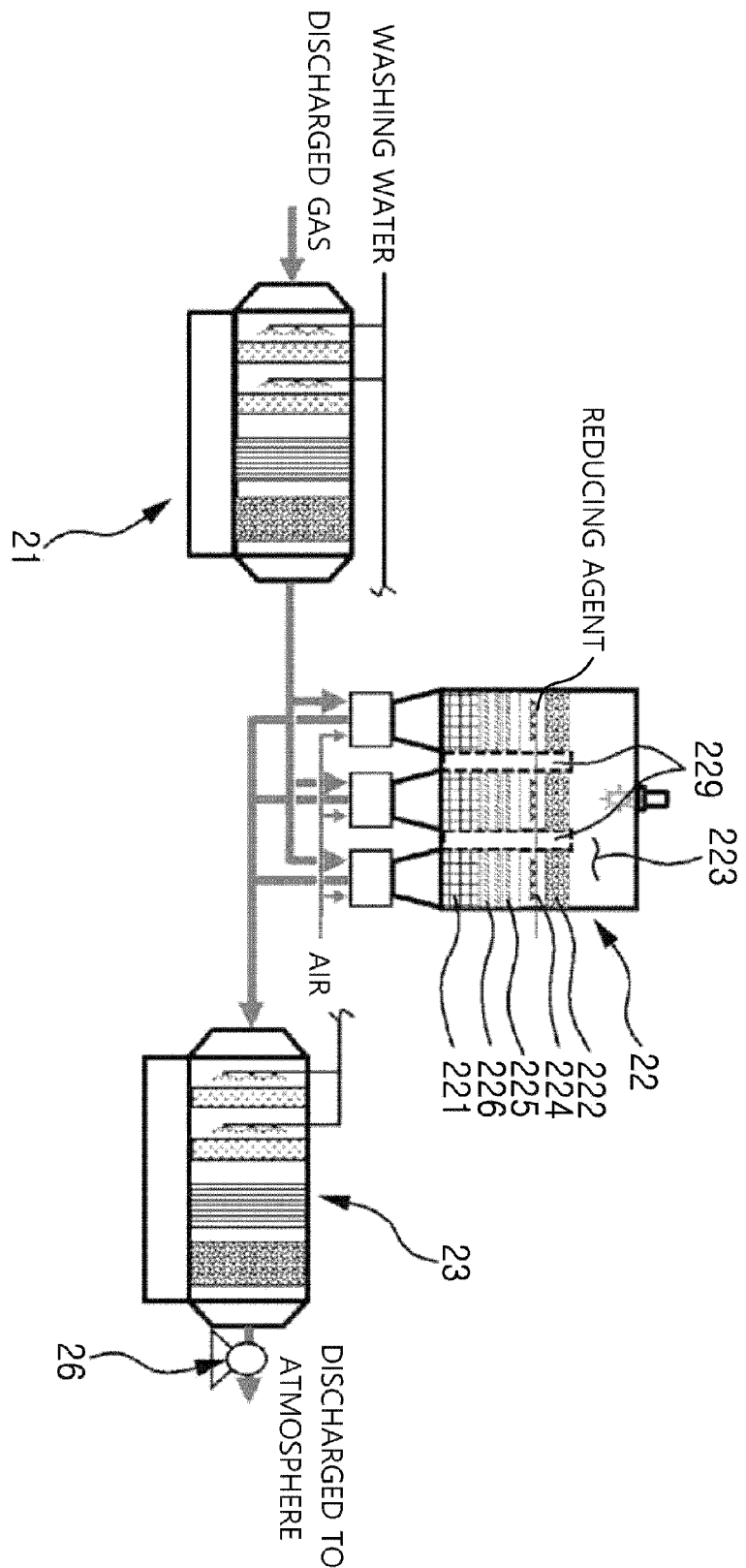
FIG. 3 is a drawing schematically illustrating a system for integrally treating a composite waste gas according to a second example of the present disclosure.

FIG. 3 is a drawing schematically illustrating a second example of the system for integrally treating a composite waste gas of the present inventive concept.

The second example of the system for integrally treating a composite waste gas of the present inventive concept includes a first wet processor 21, a decomposing reactor 22, and a second wet processor 23. A fan 26 is disposed at the rearmost end of the system.

The decomposing reactor 22 of the second example is different from the decomposing reactor 12 of the first example, but devices the same as or similar to the first and second wet processors 21 and 23 of the first example and arrangements thereof may be applied. Accordingly, the decomposing reactor 22 is mainly described below.

Decomposing Reactor 22

The decomposing reactor 22 of the system according to the second example may be a vertical decomposing reactor wherein an interior of a processing chamber thereof includes two or more compartment spaces divided by partition walls 229 with a predetermined height and a combustion chamber 223, in an integrated space, provided above the compartment spaces. The illustrated example has three compartment spaces.

In each of the two or more compartment spaces of the decomposing reactor 22, a regenerator layer 221, a third catalytic layer 226 for decomposing $NO_x$, a second catalytic layer 225 for decomposing $N_2O$, a reducing agent spraying part 224, and one or more first catalytic layers 222 for decomposing CFCs, HCFCs, HFCs, and PFCs are sequentially stacked from bottom to top.

A lower part of each of the two or more compartment spaces may be provided with a gas inflow and discharge port and a damper. When any one among the gas inflow and discharge ports functions as a gas inlet port, and the other one may function as a discharge port.

Accordingly, when a composite waste gas is introduced to any one among the gas inflow and discharge ports, the composite waste gas passes through the regenerator layer 221, the third catalytic layer 226 for decomposing $NO_x$, the second catalytic layer 225 for decomposing $N_2O$, and the one or more first catalytic layers 222 for decomposing CFCs, HCFCs, HFCs, and PFCs, and CFCs, HCFCs, HFCs, and PFCs in the composite waste gas are decomposed in the combustion chamber 223. The composite waste gas pass through the other compartment spaces and some components are reduced by the reducing agent spraying part 224. Nitrogen oxides are decomposed in the second and the third catalytic layers 225 and 226 and then are discharged through gas inflow and discharge ports at respective lower parts of corresponding compartment spaces. Gas in the decomposing reactor 22 is decomposed through an alternating opening and closing operation by the damper, and then the decomposed gas is transferred to the second wet processor 23.

The configurations and operations of the first wet processor 21, the second wet processor 23, and the fan 26 may be the same as those described in the first example. Accordingly, detailed description thereof is omitted.

Third Example

Figure 4:
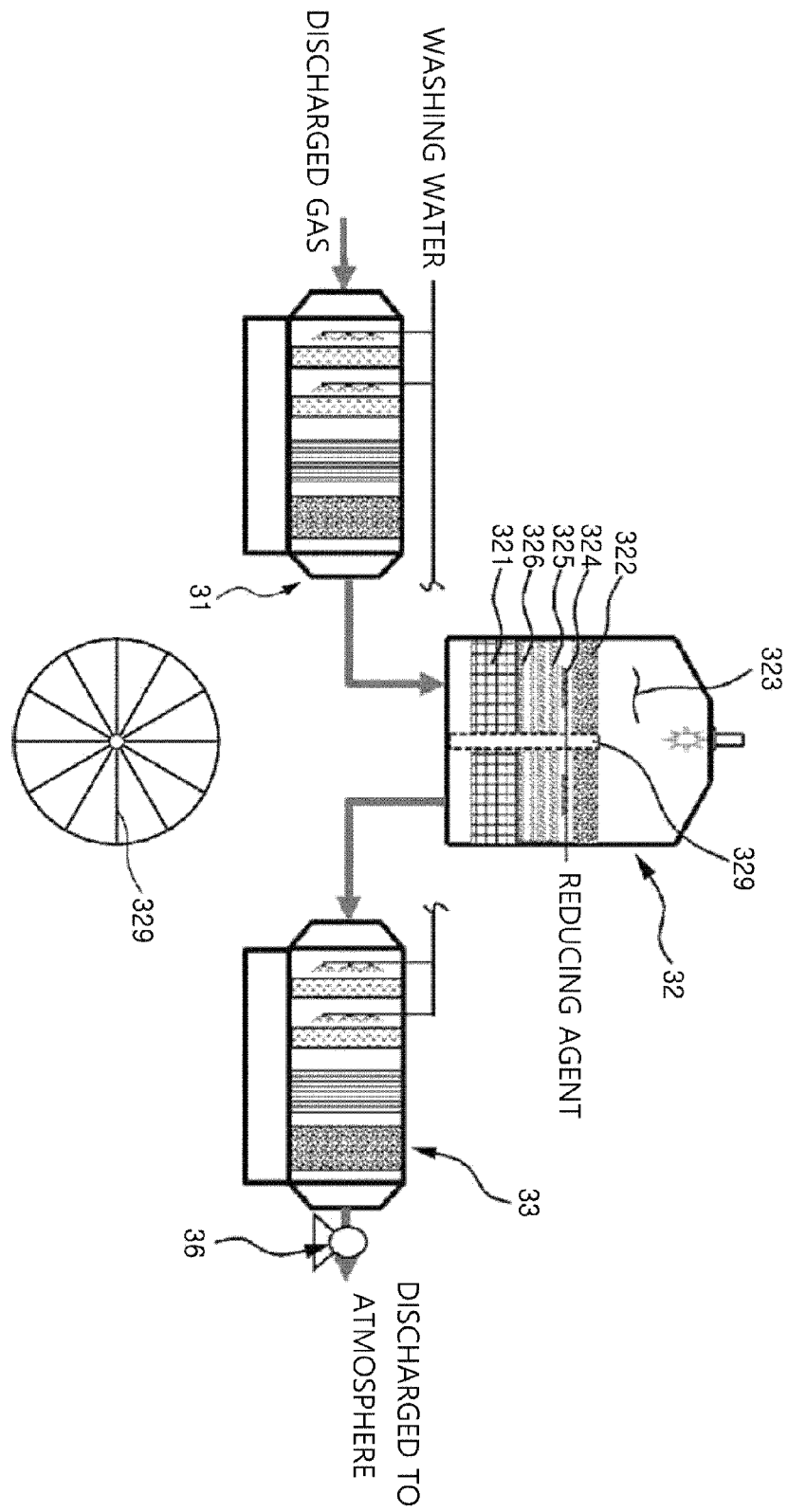
FIG. 4 is a drawing schematically illustrating a system for integrally treating a composite waste gas according to a third example of the present disclosure.

FIG. 4 is a drawing schematically illustrating a system for integrally treating a composite waste gas according to a third example of the present disclosure. For reference, a circular view provided at a lower center part of FIG. 4 is a flat sectional view schematically illustrating a decomposing reactor 32.

The system for integrally treating a composite waste gas according to the third example includes a first wet processor 31, a decomposing reactor 32, and a second wet processor 33. The fan 36 is disposed at the rearmost end of the system.

The decomposing reactor 32 of the system according to the third example has a cylindrical body. In a processing chamber of the decomposing reactor 32, 12 compartment spaces divided by one or more partition walls 329 with a predetermined height and a combustion chamber 323 provided in an integrated space over the compartment spaces are included.

In each of the compartment spaces of the decomposing reactor 32 according to the third example, a regenerator layer 321, a third catalytic layer 326 for decomposing $NO_x$, a second catalytic layer 325 for decomposing $N_2O$, a reducing agent spraying part 324, and one or more first catalytic layers 322 for decomposing CFCs, HCFCs, HFCs, and PFCs are sequentially stacked from bottom to top.

A gas door is disposed at a lower part of the reactor body to alternately open and close the respective compartment spaces while rotating.

Accordingly, when a composite waste gas is introduced to any one compartment space, the composite waste gas passes through the regenerator layer 321, the third catalytic layer 326 for decomposing $NO_R$, the second catalytic layer 325 for decomposing $N_2O$, and the one or more first catalytic layers 322 for decomposing CFCs, HCFCs, HFCs, and PFCs. CFCs, HCFCs, HFCs, and PFCs in the composite waste gas are decomposed in the combustion chamber 323. The composite waste gas passes then through the other compartment spaces and the part of the composite waste gas are reduced by the reducing agent spraying part 324. Nitrogen oxides are decomposed in the second and the third catalytic layers and then discharged through a lower part of a corresponding compartment space. Decomposed gas is transferred to the second wet processor 33.

The configurations and operations of the first wet processor 31, the second wet processor 33, and the fan 36 may be the same as those described in the first example. Accordingly, detailed description thereof is omitted.

In addition, the system for integrally treating a composite waste gas of the present disclosure is not limited to a horizontal type, wherein harmful gas flows in a horizontal direction, as illustrated as the first wet processors 11, 21, and 31 and the second wet processors 13, 23, and 33 in the examples, and may be another type such as a vertical type.

Harmful gas- or treated gas-contacting parts of the components of the first to third examples may be made of alloy steel including Ni, Cr, and Fe, or alloy steel including Ni, Cr, Mo, and Fe.

The alloy steel including Ni, Cr, and Fe may be formed of 73 to 79% by weight of Ni, 14 to 16% by weight of Cr, 4 to 11% by weight of Fe, and inevitable impurities. Preferably, the alloy steel including Ni, Cr, and Fe may be formed of 76% by weight of Ni, 15% by weight of Cr, 8% by weight of Fe, and inevitable impurities.

The alloy steel including Ni, Cr, Mo, and Fe may be formed of 60 to 62% by weight of Ni, 21 to 22% by weight of Cr, 8 to 10% by weight of Mo, 7 to 9% by weight of Fe, and inevitable impurities. In this case, 61% by weight of Ni, 21.5% by weight of Cr, 9% by weight of Mo, and 8% by weight of Fe are preferred.

In addition, the alloy steel including Ni, Cr, Mo, and Fe may be formed of 56 to 58% by weight of Ni, 15 to 17% by weight of Cr, 15 to 17% by weight of Mo, 5 to 6% by weight of Fe, and inevitable impurities. In this case, 57% by weight of Ni, 16% by weight of Cr, 16% by weight of Mo, 5.5% by weight of Fe, and inevitable impurities are preferred.

In addition, the alloy steel including Ni, Cr, Mo, and Fe may be formed of 58 to 60% by weight of Ni, 20 to 21% by weight of Cr, 14.0 to 14.5% by weight of Mo, 2.2 to 2.4% by weight of Fe, and inevitable impurities. In this case, 59% by weight of Ni, 20.5% by weight of Cr, 14.2% by weight of Mo, 2.3% by weight of Fe, and inevitable impurities are preferred.

In addition, a coating layer having heat resistance or chemical resistance is preferably provided on metallic surfaces of at least the harmful gas- or treated gas-contacting parts. Here, the coating layer may be a polymer coating layer containing xylylene or Parylene. The coating layer may also be a composite resin coating layer containing polytetrafluoroethylene (PTFE), perfluoroalkoxy (PFA), a fluorinated ethylene propylene copolymer (FEP), or an ethylene tetrafluoroethylene copolymer (ETFE).

Figure 5:
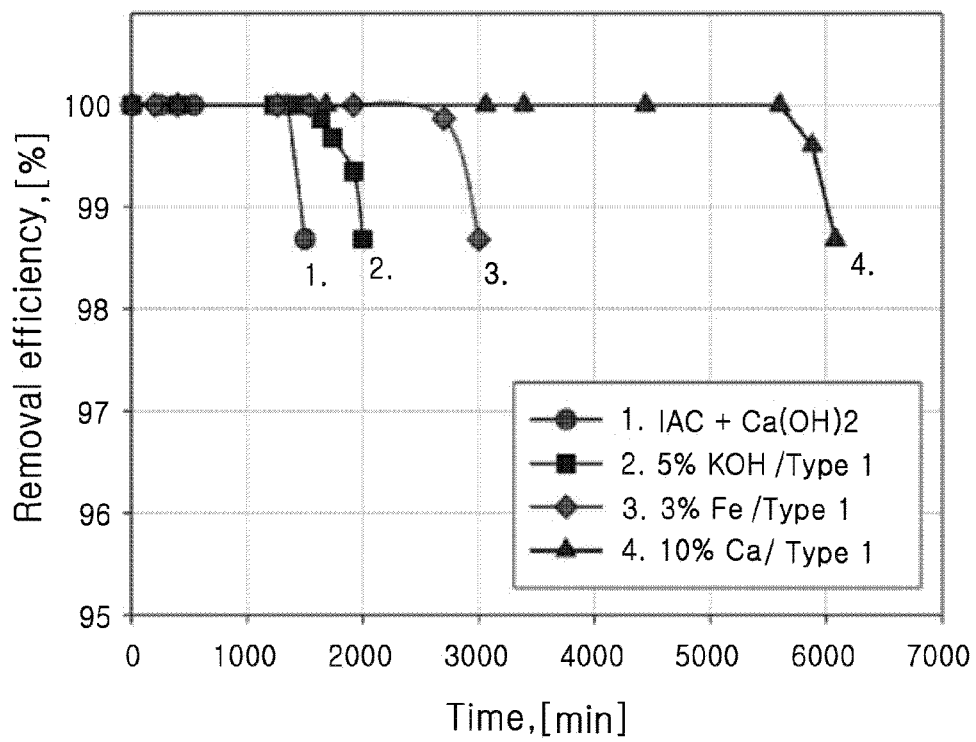
FIG. 5 is a graph illustrating adsorption performance, which depends upon applicable adsorbent types, over time in a system of the present disclosure.

FIG. 5 is a graph illustrating adsorption performance, which depends upon applicable adsorbent types, over time in a system of the present inventive concept.

Figure 6:
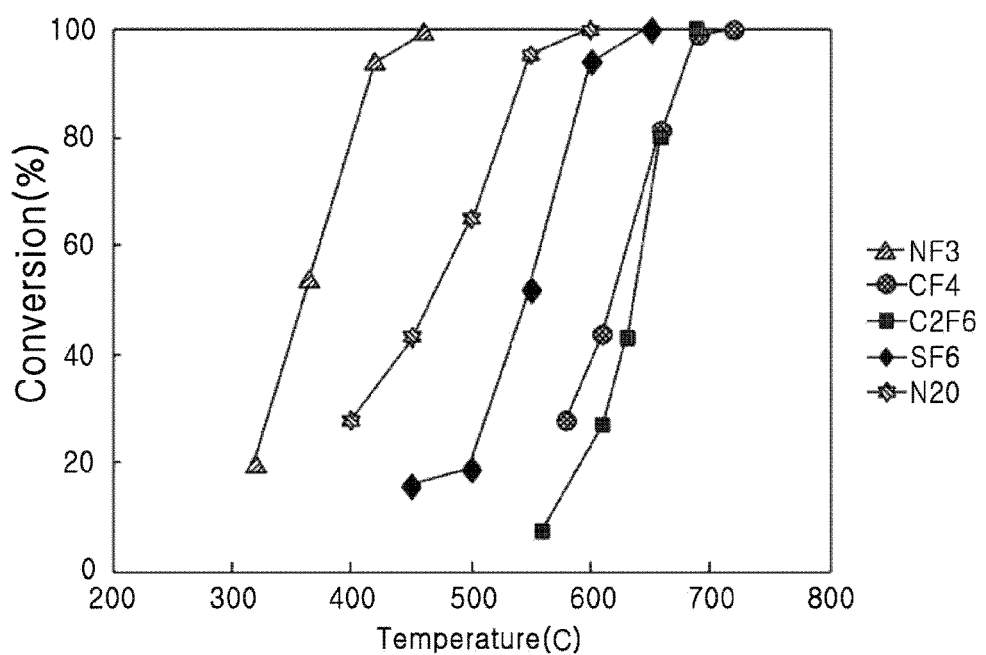
FIG. 6 is a graph illustrating removal efficiency per harmful ingredient, which depends upon temperature, in a decomposing reactor of the system of the present disclosure.

FIG. 6 is a graph illustrating removal efficiency per harmful ingredient, which depends upon temperature, in a decomposing reactor of the system of the present inventive concept.

Figure 7:
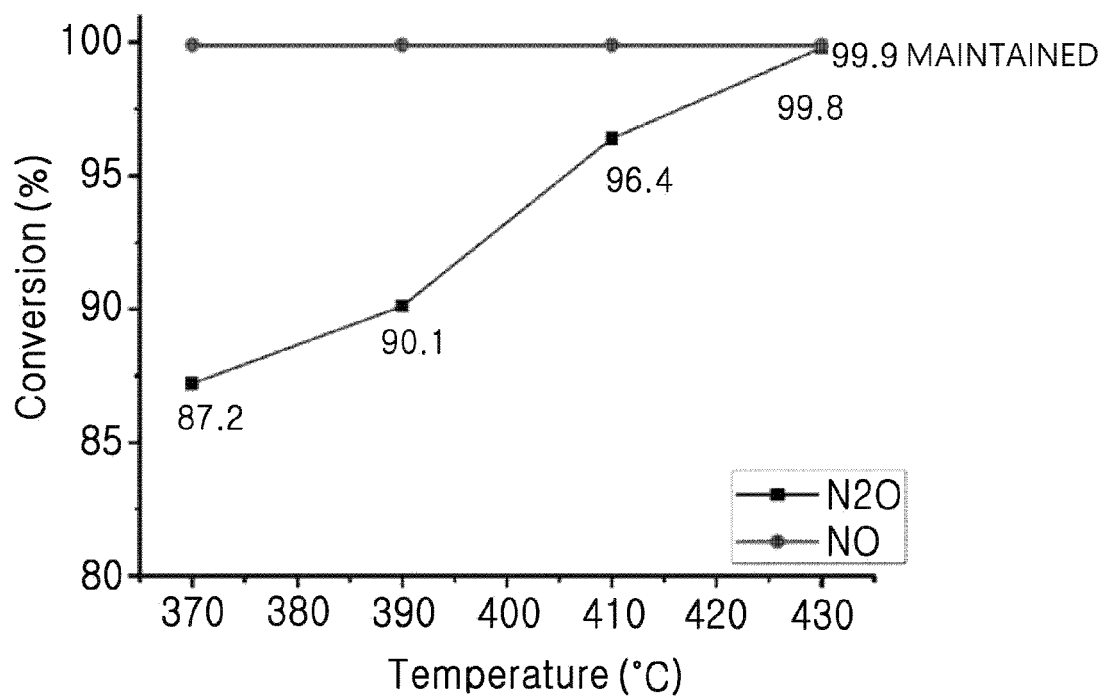
FIG. 7 is a graph illustrating decomposing efficiencies for $N_2O$ and NO, which depend upon temperature, in the system of the present disclosure.

FIG. 7 is a graph illustrating decomposing efficiencies for $N_2O$ and NO, which depend upon temperature, in the system of the present inventive concept.

As shown above, the system for integrally treating a composite waste gas of the present inventive concept can integrally process a large amount of composite waste gas and exhibits high decomposing efficiency for each of the harmful ingredients included in the composite waste gas.

While the embodiments of the present inventive concept have been described, those skilled in the art will appreciate that many modifications and changes can be made to the present invention without departing from the scope of the present invention.

DESCRIPTION OF SYMBOLS 11, 21, 31: First wet processor
12, 22, 32: Decomposing reactor
13, 23, 33: Second wet processor
14: Heat exchanger
15: Preheater
16, 26, 36: Fan
111, 131: Cleaning water spraying part
112, 132: Filter layer or packing layer
113, 133: First adsorption layer
114, 134: Second adsorption layer
121, 221, 321: Regenerator layer
122, 222, 322: First catalytic layer
123, 223, 323: Combustion chamber
124, 224, 324: Reducing agent spraying part
125, 225, 325: Second catalytic layer
126, 226, 326: Third catalytic layer
229, 329: Partition wall

The invention claimed is:

1. A system for integrally treating a composite waste gas comprising nitrogen oxides (NOx and N2O), chlorofluorocarbons (CFCs), hydrochlorofluorocarbons (HCFCs), hydrofluorocarbons (HFCs), and perfluorinated compounds (PFCs), the system comprising a first wet processor configured to wash and adsorb dust comprising gases, SOx, and ash dissolved in water;
a decomposing reactor configured to receive waste gas processed in the first wet processor and process nitrogen oxides (NOx and N2O), fluorocarbons (CFCs), hydrochlorofluorocarbons (HCFCs), hydrofluorocarbons (HFCs), and perfluorinated compounds (PFCs) in the waste gas; and
a second wet processor configured to receive the waste gas processed in the decomposing reactor and wash and adsorb the received waste gas.

2. The system according to claim 1, wherein one or more regenerator layers, one or more first catalytic layers for decomposing CFCs, HCFCs, HFCs, and PFCs, a combustion chamber, a reducing agent spraying part, a second catalytic layer for decomposing N2O, and a third catalytic layer for decomposing NOx are disposed in a processing chamber of the decomposing reactor.

3. The system according to claim 2, wherein the decomposing reactor is a horizontal type wherein a regenerator layer, a first catalytic layer, a combustion chamber, a first catalytic layer, a reducing agent spraying part, a second catalytic layer, a third catalytic layer, and a regenerator layer are sequentially disposed from a side in which waste gas is introduced.

4. The system according to claim 3, further comprising a heat exchanger configured to allow heat exchange between gas transferred to the decomposing reactor from the first wet processor and gas transferred to the second wet processor from the decomposing reactor.

5. The system according to claim 4, further comprising a preheater configured to pre-heat waste gas introduced to the decomposing reactor.

6. The system according to claim 2, wherein the decomposing reactor is a vertical type wherein two or more compartment spaces divided by partition walls having a predetermined height; and a combustion chamber provided in an integrated space over the compartment spaces are comprised in the processing chamber of the decomposing reactor.

7. The system according to claim 6, wherein a regenerator layer, a third catalytic layer, a second catalytic layer, a reducing agent spraying part, and a first catalytic layer are sequentially stacked from bottom to top in each of the two or more compartment spaces, and gas inflow and discharge ports are respectively provided at lower parts of the two or more compartment spaces.

8. The system according to claim 7, wherein, when any one of the gas inflow and discharge ports operates as a gas inlet port, any one of the remaining gas inflow and discharge ports operates as a discharge port.

9. The system according to claim 1, wherein two or more filter layers or packing layers, a cleaning water spraying part disposed so as to spray washing water to each of the two or more filter layers or packing layers, and two or more adsorption layers are comprised in an interior of each of the first and second wet processors.

* * * * *